United States Patent [19]

Moore

[11] Patent Number: 5,613,579
[45] Date of Patent: Mar. 25, 1997

[54] LATCH LOCKING SPRING CLIP FOR RETAINING AN INSERTABLE BRAKE SHOE LINING ON A DISC BRAKE HEAD

[75] Inventor: Roland S. Moore, Greenville, S.C.

[73] Assignee: Westinghouse Air Brake Company, Wilmerding, Pa.

[21] Appl. No.: 976,610

[22] Filed: Nov. 16, 1992

[51] Int. Cl.[6] ........................................... F16D 65/04
[52] U.S. Cl. ................................. 188/244; 188/211
[58] Field of Search .................................. 188/211, 234, 188/235, 232, 244, 245, 243, 242, 220.1, 220.6; 24/710.2, 537.1; 411/513, 514, 515, 516, 530

[56] References Cited

U.S. PATENT DOCUMENTS

| | | | |
|---|---|---|---|
| 1,335,214 | 3/1920 | Whitney | 188/211 |
| 2,711,801 | 6/1955 | Super et al. | 188/242 |
| 3,851,738 | 12/1974 | Gebhardt et al. | 188/244 |

FOREIGN PATENT DOCUMENTS

| | | | |
|---|---|---|---|
| 285227 | 1/1965 | Netherlands | 411/530 |

*Primary Examiner*—Matthew C. Graham
*Attorney, Agent, or Firm*—James Ray-John Sotak

[57] ABSTRACT

A latch retaining spring with clip for securely locking a brake shoe on a brake head carrier of a disc brake assembly for railway vehicles. The wire clip includes a coiled loop portion having a first straight leg section extending from one end thereof. A reverse turned portion extending from the other end of the coiled loop portion and terminating in a second straight leg portion. The first straight leg portion is inserted into a through hole formed in one of two lugs carried by the brake head carrier and into an aligned through hole formed in a pivotal latch member. The second straight leg portion inserted into a through hole formed in another of the two lugs carried by the brake head carrier.

12 Claims, 2 Drawing Sheets

LATCH LOCKING SPRING CLIP FOR RETAINING AN INSERTABLE BRAKE SHOE LINING ON A DISC BRAKE HEAD

FIELD OF THE INVENTION

The invention relates to a disc brake shoe retaining clasp and, more particularly, to latch locking spring clip for securely holding a brake shoe lining to a brake head carrier for a caliper disc brake unit for railway vehicles.

BACKGROUND OF THE INVENTION

Certain disc brake units for railway vehicles are provided with a latch which is pivotally mounted on the brake shoe lining carrier having a dovetail groove or slot mortise for accommodating a matching dovetail tenon carried by the brake shoe backing plate. After the brake shoe lining is mounted to the carrier, the pivoted latch is moved to its locked position in which holes in the two locking lugs become aligned with a hole formed in the free end of the pivotal latch. In the past, the latch was locked by inserting a latch locking pin through the aligned holes. The latch locking pin had a configuration similar to a bobby hair pin having a bight portion from which extended a first straight leg and a second serpentine leg. Normally, the straight leg is vertically inserted into the hole in the top lug and then thrust through the holes in the pivotal latch and bottom lug. The serpentine leg frictionally engages the outer surfaces of the two lugs to maintain the pin in place. Generally, the hair pin operated satisfactorily if it was properly and initially inserted into the hole in the top lug of the brake shoe head carrier. However, it has been found that maintenance workers and/or other railroad personnel have not followed the instructions and procedures as outlined in the manufacturer's operating manual. For one reason or another, the bobby hair pins have been installed in a reverse or upside-down manner. That is, the straight leg was being initially inserted into the hole of the bottom lug and then pushed through the holes in the pivotal latch and top lug. While the brake shoe appears to be positively locked to the brake head carrier, it has been discovered that when the reversely installed hair lock pin falls out, the brake shoe falls off of the brake head carrier. That is, the vibrational and gravitational forces experienced by the railway vehicles during the normal course of travel have a tendency to loosen the reversely inserted pin and cause it to drop out of the holes. The loss of the lock pin permits the pivotal latch to move or swing to its unlocked position so that the brake shoe falls off the brake head so that the braking action on the brake unit is rendered inefficacious. It will be appreciated that the loss of brake shoe can cause severe damage to brake unit and can jeopardize the safe operation of the railway vehicle.

OBJECTS AND SUMMARY OF THE INVENTION

Accordingly, it is an object of this invention to provide a new and improved latch locking spring clip for positively locking a disc brake shoe on a brake head of a disc brake unit.

Another object of this invention is to provide a unique brake shoe retaining device which effectively locks the brake shoe lining of a disc brake unit on a railway vehicle.

A further object of this invention is to provide a novel brake head latch spring clip having a long leg which extends into a hole formed in one lug member as well as into a hole formed in a pivotal latch member and having a short leg which extends in a hole formed in another lug member.

Still another object of this invention is to provide a latch locking spring wire clip having a single-turn bight portion and including a first long straight portion extending therefrom, as well as including a second reversely turned portion extending therefrom.

Still a further object of this invention is to provide a latch locking spring clip for securely retaining a brake shoe on a brake head of a disc brake unit comprising, a coiled bight portion, a first straight leg portion extending from one end of said coiled bight portion, a reversed turned portion extending from the other end of said coiled bight portion and terminating in a second straight leg portion, said first straight leg portion inserted into a hole formed in one of two lugs carried by the brake head and into an aligned hole formed in a latch member, and said second straight leg portion inserted into a hole formed in another of the two lugs carried by the brake head.

Yet another object of this invention is to provide retaining clasp comprising, a loop portion, a straight leg portion extending from one end of said loop portion, a hook-shaped portion extending from the other end of said loop portion, said hook-shaped portion including a first straight section leading to a curved section which exits into a second straight section that is bent substantially ninety degrees to form an end portion which is substantially parallel to said first straight section.

Yet a further object of this invention is to provide an improved latch locking wire clip which is simple in design, efficient in operation, economical in cost, reliable in use, durable in service, unique in construction, and easy to use.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
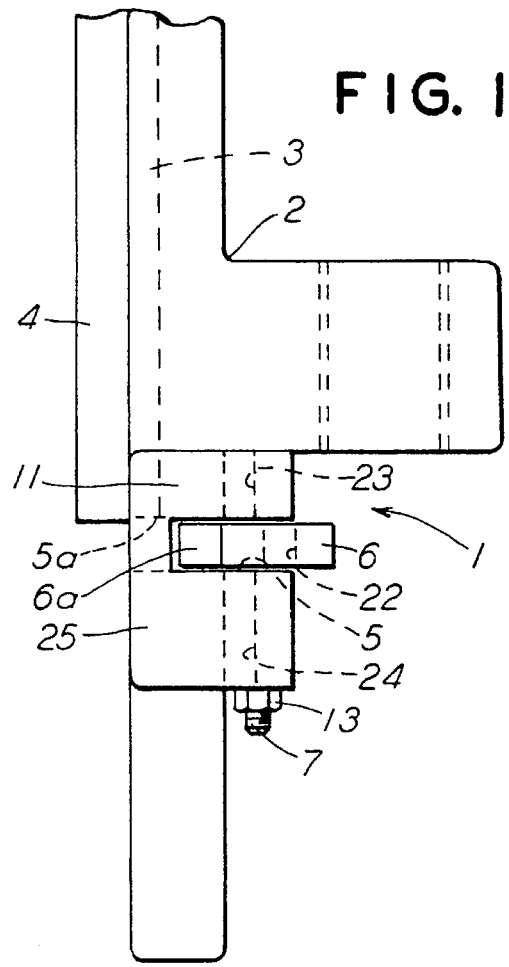
FIG. 1 is a fragmentary side elevational view of the disc brake unit with the brake head latch in its open and unlocked position and void of the latch locking spring wire clip.
Figure 2:
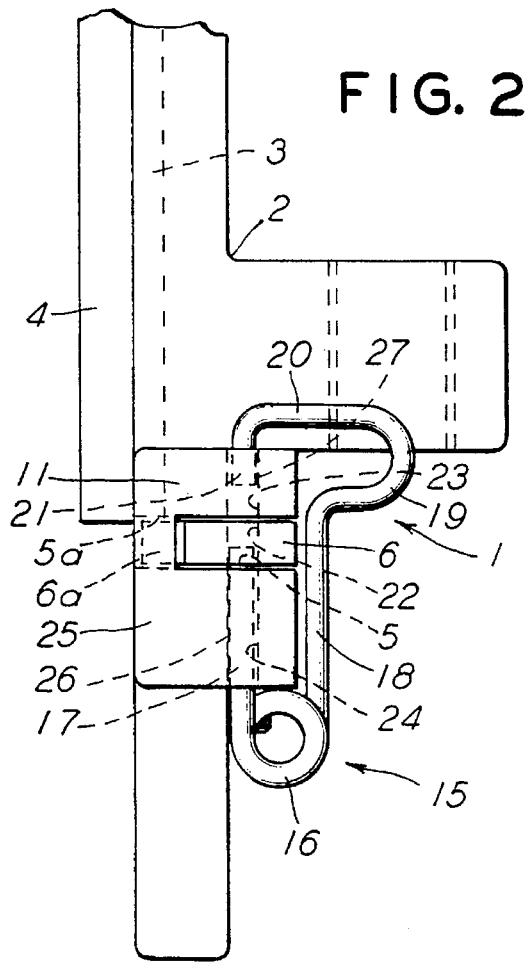
FIG. 2 is a side elevational view of the disc brake unit employing the latch locking spring steel clip with the brake head latch in its closed and locked position.
Figure 3:
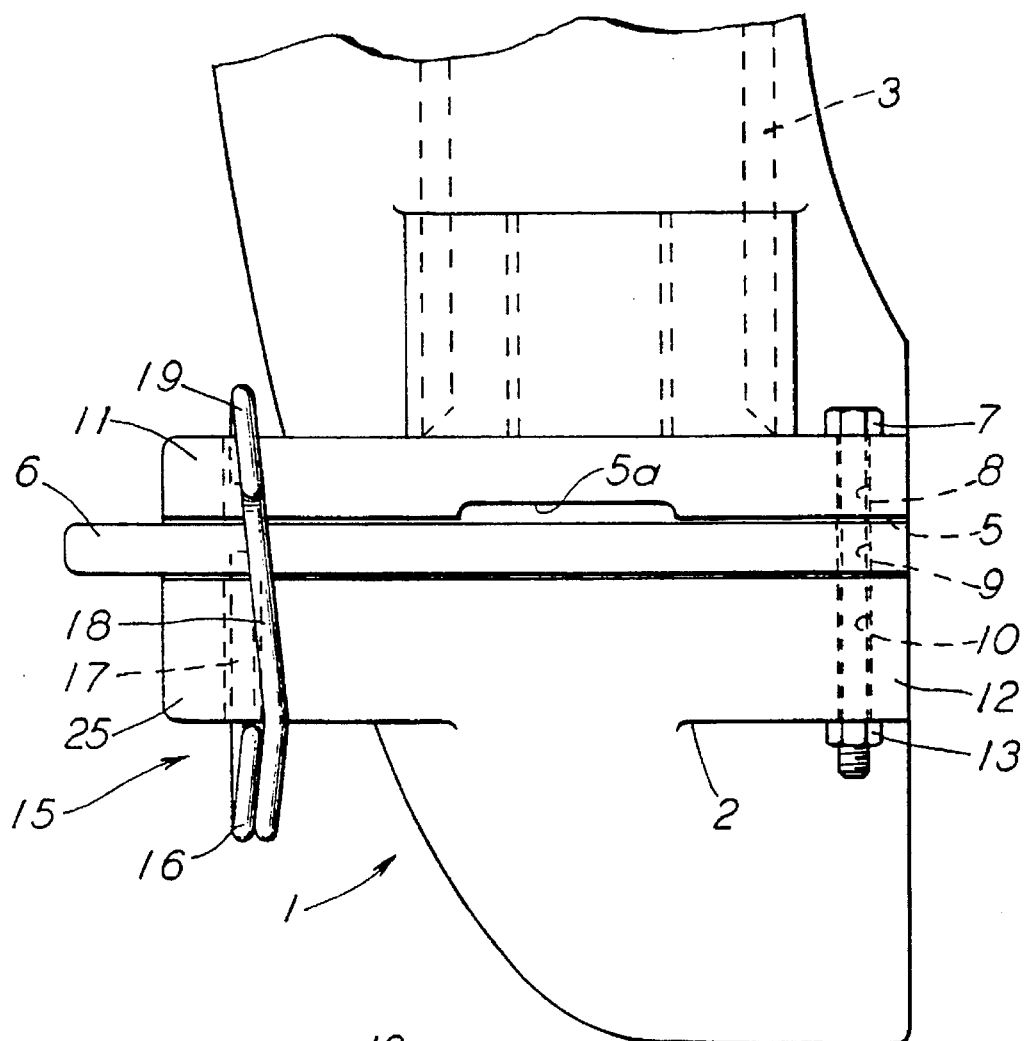
FIG. 3 is a fragmentary rear plan view of the disc brake unit of FIG. 2.
Figure 3:
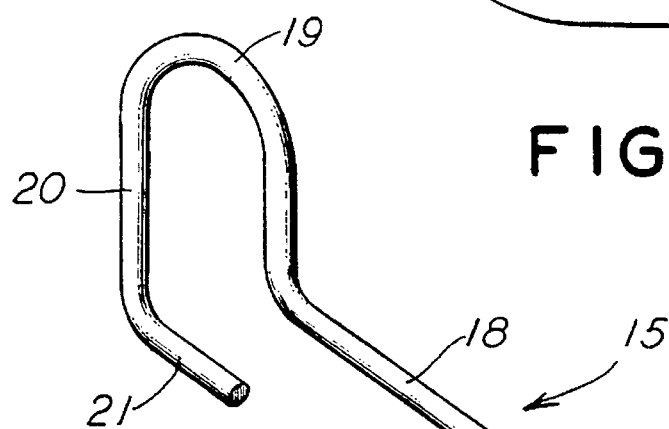
Figure 5:
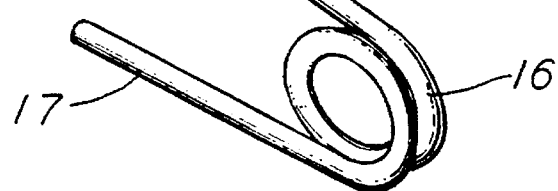
FIG. 5 is a slightly enlarged perspective view of the latch locking spring wire clip for securely retaining a brake shoe on a brake head of a disc brake unit in accordance with the present invention.

Referring now to the drawings and in particular to FIGS. 1, 2, and 3, it will be noted that the disc brake unit generally characterized by number 1 includes a brake head or support carrier 2 having an elongated vertical dovetail-shaped slot 3 formed on the inner face or inside surface thereof. It will be seen that the slot 3 is opened and tapered at its lower end to form a brake lining guide for dovetail tenon carried by a backing plate (not shown) of a brake shoe lining 4. The lower end of brake head 2 includes a transverse through groove or notched opening 5a which is perpendicular to the vertical dovetail slot 2. The notched opening 5a accommodates a central tab or intermediate inward projecting portion 6a of the pivotal brake head latch or locking bar 6. The intermediate inward projecting portion 6a is received and fits into the elongated through notch or slot 5a formed in the brake head or carrier 2, as shown in FIG. 2. In viewing FIGS. 1 and 3, it will be seen that, when the locking bar 6 is in its closed or locked position, the right or fixed end of the retainer bar 6 is pivoted about a hex-head cap screw or bolt 7. The pivot bolt 7 passes through the aligned holes 8, 9 and 10 formed in an upper crossbar or lug 11, the retaining bar 6 and a first lower lug 12, respectively. An elastic stop nut 13 is threaded onto the lower end of pivot bolt 7 to securely hold it in place.

As shown in FIG. 1, when retaining bar 6 is in its unlocked position, a maintainer may readily remove a worn friction brake shoe from the brake head or carrier 2 by withdrawing the dovetail tenon from the dovetail slot 3. That is, the old worn brake shoe is slid downwardly out of slot 3 until the top of the dovetail tenon clears the bottom of the slot 3. A new replacement or original composition brake shoe 4 may be mounted to the metal brake head 2 by simply inserting the dovetail tenon into the dovetail slot 3 and sliding the brake shoe 4 upwardly until the bottom edge of the tenon clears the upper edge of notch 5a. Then, the pivotal locking bar 6 is moved or rotated about pivot bolt 7 to its closed position wherein the intermediate projection 6a becomes located in the notch 5a so that the brake shoe is locked in place. The retaining bar 6 is positively locked in its closed position by a latch locking clip or clasp 15 which is formed of spring steel or the like. As shown in FIGS. 2, 3, 4, and 5, the latch locking spring clip 15 is a preformed wire member having a circular cross-section. The clip 15 includes a bight or coiled portion 16 which is made up of a single turn. A first relatively long straight leg portion 17 extends from one end of the single turn bight 16 while the other end of the one turn coiled portion 16 is made up of a reverse turned portion. That is, an initial straight section 18 extends from the other end of the single turn coil portion 16. An intermediate loop or curved portion 19 extends from the straight section 18. A final straight section 20 is bent ninety degrees (90°) to form a second relatively short straight leg portion 21. It will be seen in FIG. 2, that in the closed position, a through hole 22 which is formed in the retaining or lock bar 6 is in alignment with through hole 23 formed in upper crossbar 11 and through hole 24 formed in a second lower lug 25, respectively.

In practice, the free end of the straight leg portion 17 of the latch locking clasp 15 is initially inserted into through hole 24, and the clip 15 is pushed upward until the top of the bight portion 16 contacts the underside of the lug 25. When the clip 15 is fully inserted, the tip or free end of the leg 17 is positioned in the hole 22 formed in the locking bar 6. Next, the loop 19 of the locking clip is grasped and slightly opened to allow the tip edge of the second straight leg 21 to clear the top surface of the cross bar 11. When the leg 21 is opposite the opening 23 the spring force will cause the leg 21 to enter the hole 23. Further, the spring force of the coil 16 will urge the outer surface 26 of the leg 17 to intimately contact the contiguous surface of holes 22 and 24, and also will cause inner surface 27 of the leg 21 to frictionally bear against the contiguous surface of hole 23. Thus, the insertion of the two legs 17 and 21 positively locks the clip 15 in place so that vibration and shock experienced by the railway vehicle will not loosen or dislodge the clip 15.

Figure 4:
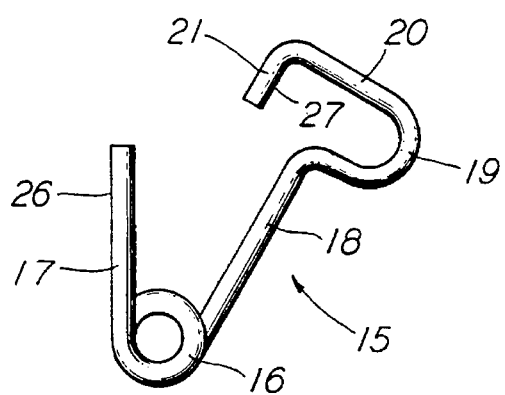
FIG. 4 is a side elevational view of the latch locking spring wire clip of FIG. 1.

Now when it is desired to remove the clip, one simply bends open the upper end so that the short leg 21 can be withdrawn from the opening 23. The spring force of the coil 16 will open and allow the clip 15 to assume a position as shown in FIG. 4. Then the lower leg 17 is withdrawn from openings 22 and 24. Thus, the latch locking bar 6 is readily unlocked.

It will be seen that even if the clip 15 is inserted in an upside-down or reverse fashion, the straight legs 17 and 21 will securely hold the locking bar 6 in its locked position. In such a situation, the first straight leg portion 17 is fully inserted into holes 23 and 22, and partially inserted into hole 24, while the second straight leg portion 21 is partially inserted into hole 24. Again, the clip 15 is positively locked in position since both legs 17 and 21 are securely retained in place.

It will be appreciated that the diameter or gauge of the wire clip may be varied in accordance with the diameters of holes 22, 23 and 24, and the specific lengths of the leg portions 17 and 21 may be modified or changed. The coiled portion may be modified, and the loop portion 19 may be reshaped and configured as a ninety-degree (90°) bend. Further, the length of the legs 17 and 21 may be varied in accordance with the thickness of cross bar 11, locking bar 6, and lug 25 or as desired to provide optimum retention.

Thus, the present invention has been described in such full, clear, concise and exact terms as to enable any person skilled in the art to which it pertains to make and use the same, and having set forth the best mode contemplated of carrying out this invention.

I state that the subject matter, which I regard as being my invention, is particularly pointed out and distinctly set forth in what is claimed. It will be understood that variations, modifications, equivalents and substitutions for components of the above specifically-described embodiment of the invention may be made by those skilled in the art without departing from the spirit and scope of the invention as set forth in the appended claims.

What I claim is:

1. A latch locking spring clip for securely retaining a brake shoe on a brake head of a disc brake unit comprising, a coiled bight portion, a first straight leg portion extending from one end of said coiled bight portion, a reversed turned portion extending from the other end of said coiled bight portion, said reversed turned portion including an initial straight section, an intermediate loop portion, and a final straight section terminating in a second straight leg portion, said first straight leg portion inserted into a hole formed in one of two lugs carried by the brake head and into an aligned hole formed in a latch member, and said second straight leg portion inserted into a hole formed in another of the two lugs carried by the brake head by grasping said intermediate loop portion to slightly open the final straight section, and allow the tip of said second straight leg portion to clear the top surface of a crossbar.

2. The latch locking spring clip for securely retaining a brake shoe on a brake head of a disc brake unit as defined in claim 1, wherein said coiled bight portion is a single turn of wire.

3. The latch locking spring clip for securely retaining a brake shoe on a brake head of a disc brake unit as defined in claim 1, wherein said coil bight portion is one loop.

4. The latch locking spring clip for securely retaining a brake shoe on a brake head of a disc brake unit as defined in claim 1, wherein said first and second straight leg portions exert a lateral force on the sides of said holes.

5. The latch locking spring clip for securely retaining a brake shoe on a brake head of a disc brake unit as defined in claim 1, wherein said first straight leg portion is initially inserted into said holes formed in said one of said two lugs and said latch member and said second straight leg portion is subsequently inserted into said hole formed in said another of said two lugs.

6. The latch locking spring clip for securely retaining a brake shoe on a brake head of a disc brake unit as defined in claim 1, wherein said first straight leg portion is offset approximately twenty degrees from said second straight leg portion.

7. The latch locking spring clip for securely retaining a brake shoe on a brake head of a disc brake unit as defined in claim 1, wherein said reversed turned portion includes an initial straight section, an intermediate curved section, and a final straight section which is bent ninety degrees to form said second straight leg portion.

8. The latch locking spring clip for securely retaining a brake shoe on a brake head of a disc brake unit as defined in claim 1, wherein said first and second straight leg portions are in axial alignment when inserted in said holes in said lugs and latch member.

9. The latch locking spring clip for securely retaining a brake shoe on a brake head of a disc brake unit as defined in claim 7, wherein said curved section may be grasped and pulled to withdraw said second straight leg portion from said hole in said another of said two lugs.

10. A wire retaining clasp comprising, a loop portion, a straight leg portion extending from one end of said loop portion, a hook-shaped portion extending from the other end of said loop portion, said hook-shaped portion including a first straight section leading to a curved section which exits into a second straight section that is bent substantially ninety degrees to form an end portion which is substantially parallel to said first straight section when the wire retaining clasp is in a closed position, and wherein said straight leg portion is offset from said end portion by approximately twenty degrees when the wire retaining clasp is in an open position, and wherein said end portion and said first straight portion are frictionally held in place.

11. The wire retaining clasp as defined in claim 10, wherein said loop portion includes a single turn.

12. The wire retaining clasp as defined in claim 10, wherein said straight leg portion is longer than said end portion.

\* \* \* \* \*